April 6, 1954 R. E. BEAL ET AL 2,674,609
DEODORIZATION PROCESS
Filed July 10, 1951
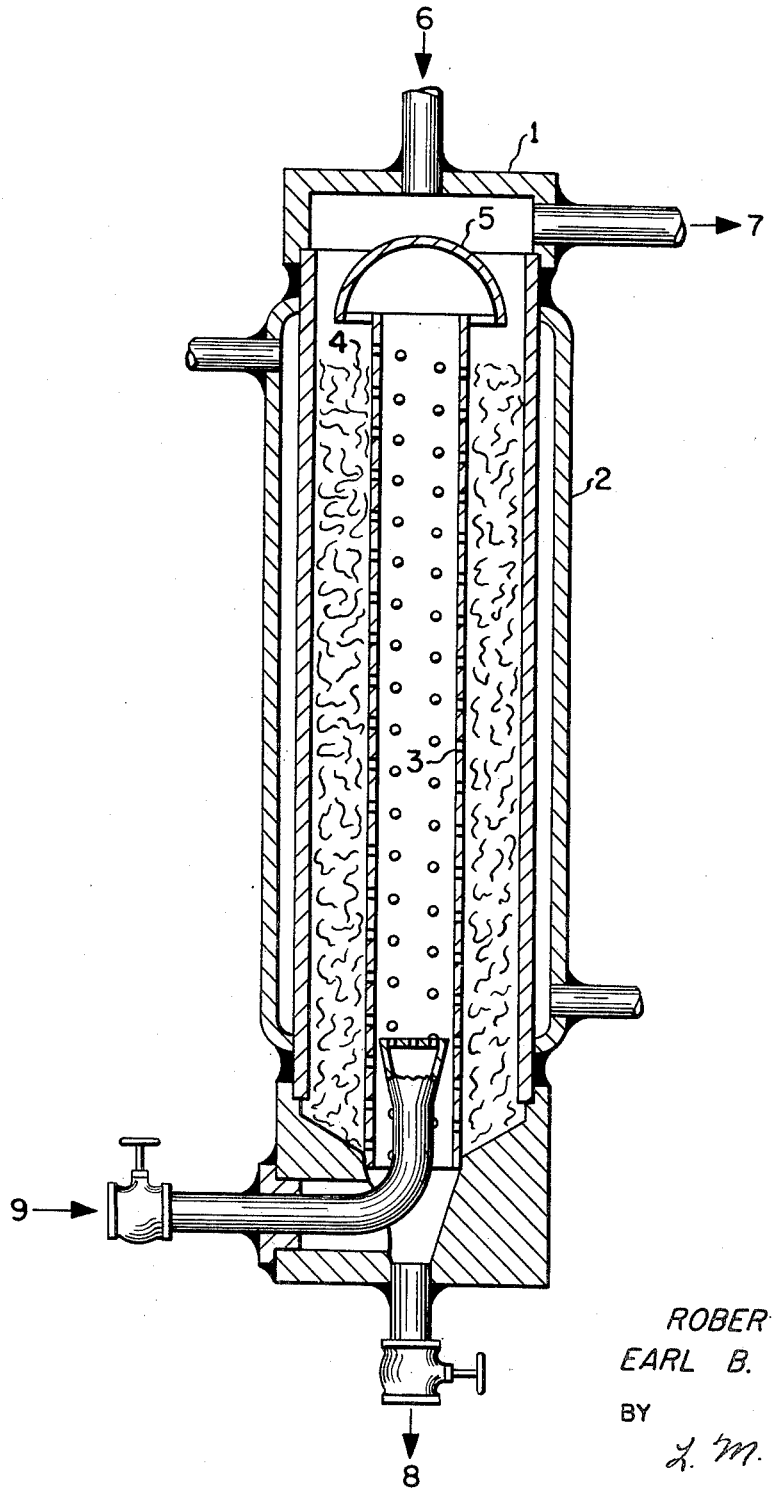
INVENTORS.
ROBERT E. BEAL
EARL B. LANCASTER
BY
L. M. Mantell
atty

Patented Apr. 6, 1954

2,674,609

UNITED STATES PATENT OFFICE 2,674,609

DEODORIZATION PROCESS

Robert E. Beal, Elmwood, and Earl B. Lancaster, Peoria, Ill., assignors to the United States of America as represented by the Secretary of Agriculture Application July 10, 1951, Serial No. 236,050

7 Claims. (Cl. 260—428)

(Granted under Title 35, U. S. Code (1952), sec. 266)

The invention herein described may be manufactured and used by or for the Government of the United States of America for governmental purposes throughout the world without the payment to us of any royalty thereon.

This invention relates to a novel method for deodorizing glyceride oils. It relates, more particularly, to a novel method for removing objectionable odors and flavors from vegetable oils, such as soybean oil, cottonseed oil, peanut oil, mustard seed oil, sunflower seed oil and the like, whereby an improved edible product is produced.

It is customary, in refining vegetable oils such as those previously mentioned, to subject the oils to a deodorization treatment as a more or less final step. This is usually accomplished by subjecting the degummed and bleached oil to a low pressure separatory distillation, using steam as a stripping means. This is essentially a process of steam distillation wherein relatively volatile odoriferous and flavored substances are stripped from the relatively nonvolatile oil. The operation is carried out at high temperatures, i. e., about 400° to 475° F. and at reduced pressure, i. e., about 4–20 mm. Hg (4,000 to 20,000 microns), to increase the volatility of the undesired components and to protect the oil from oxidation. The time of exposure of the oil to these conditions varies from one to eight hours, and steam consumption is 1 to four pounds per hundred pounds of oil per hour.

Within the operating limits outlined above, prior workers have been aware that a high vacuum in deodorizing is advantageous in every respect. Our own studies have shown, moreover, that a reduction in absolute pressure to less than say 0.5 millimeter at temperatures above 400° F., causes a very distinct development of undesirable odor and flavor in the treated oils. Thus, for reasons not fully known, it is necessary to operate at pressures within the named range in order to produce a satisfactory product according to prior methods.

Prior workers, moreover, have recognized the influence of temperature on the rate and efficiency of removal of volatile constituents from the oil, employing increased temperatures whenever possible to decrease the time and increase the effectiveness of removal.

In addition to the foregoing methods, it has been suggested that low pressures of the order to 30–100 microns together with temperatures of 375° to 400° F. be employed in a straight separatory distillation to remove free fatty acids and improve the odor and flavor of vegetable oils, but that method has not met with wide success. As previously noted for reasons not fully known, the flavors of such oils have generally not been up to expectations.

The prior methods of deodorization have required rather costly equipment, and have required relatively large quantities of steam. Moreover, the high temperatures involved result in considerable heat losses unless elaborate heat saving measures are taken.

We have discovered that the behavior of glyceride oils at elevated temperatures and reduced pressures is peculiar in that there is a critical relationship between the temperature and pressure for satisfactory improvement in odor and flavor. We have discovered that the desired deodorization can be achieved within the drastically lowered temperature range of 190°–250° F. provided the pressure is maintained within the range of 20 to 60 microns. We have discovered, moreover, that the deodorization, when carried out in accordance with our invention, requires only about one-tenth the time formerly required, and furthermore requires less than one-twentieth the steam per unit weight of oil per hour. An additional advantage of our invention is that it is readily adaptable to continuous operation, thus requiring less costly equipment and affording greater ease of control.

According to our invention, the glyceride oil to be deodorized is subjected to the designated conditions of temperature and pressure for a period of 3 to 10 minutes. In order to facilitate the volatilization of the undesired constituents from the oil, stripping agents such as water, hexane, lower alcohols, or the like may be added in the amount of 0.1 to 5 percent, by volume, of the oil. Inasmuch as our conditions are not those of molecular distillation, we provide a relatively long path between the zone of evaporation and the condensing or vapor collecting zone.

Our invention may be carried out in an apparatus such as shown in the accompanying drawing. In the figure, 1 represents a distillation column, jacketed at 2. The column is provided with a concentrically disposed perforated tube 3 which may extend throughout the entire length of the column.

The annular space between the perforated tube and the inner wall of the column is packed as shown by 4, with such material as Raschig rings, Fiberglas or the like to facilitate spreading the distilland over a large area and thus expose a maximum surface to evaporation. The perforated tube is covered by a cap 5 upon which flows the feed oil, fed from inlet 6. In the region of the feed inlet, the column is provided with an outlet opening 7 for the exit of vapors, and in the region of the bottom of the perforated tube, an outlet 8 for the deodorized product. The column is also provided at 9 with an inlet for the introduction of a stripping agent such as steam.

In operation of our process, the oil to be deodorized is preferably degassed to remove molecular oxygen and is then fed continuously into such an apparatus as shown, the feed entering at 6. The column is maintained at an absolute pressure of 20–60 microns, and is heated to a temperature of 190°–250° F. The feed oil flows over the spreading cap and downwardly through the packed annular section of the column. The downward flow is impeded by the packing, and the oil may also flow through the perforated tube and down the inner wall thereof in a falling film.

The rate of feed is adjusted so as to effect a sojourn time of the downwardly flowing oil of about three to 10 minutes in the column. The deodorized product is withdrawn at the product outlet.

The vapors exit from the top of the column where they may be condensed or otherwise collected in known manner. We prefer to employ a vapor diffusion pump (not shown) to maintain the required pressure in the still system, and to condense the vapors in a refrigerated vapor trap at some temperature below 0° F.

In our process, when deodorizing oils such as soybean oil, palm oil and the like, which usually require a heat bleaching treatment, the feed oil may be first subjected to degassing and heat treatment at about 420°–450° F. for about three to 15 minutes. The hot oil from this treatment may then be fed directly into the zone of deodorization.

As previously stated, we may employ volatile stripping agents admixed with the feed oil or passing countercurrent thereto to facilitate removal of the volatile principles from the oil. These agents may be alcohol, hexane, heptane, or a similar volatile oil solvent, or the oil may be emulsified with water.

We have discovered that both the lower and upper limits of pressure employed in our process are critical within our temperature range. Surprisingly, pressures substantially below 20 microns result in poor quality, off-flavored product. Moreover, within our pressure range, temperatures substantially higher than 250° F. likewise result in a product of less acceptable flavor.

The following specific examples illustrate the invention.

Example I

A soybean oil, degummed, alkali refined and bleached in the conventional manner, was deodorized in a falling film type column such as shown in the drawing. The temperature in the column was maintained at 194° F. and the pressure at 47 microns mercury absolute. The oil flow rate was continuous at 56 cc. per hour. Stripping steam was introduced, countercurrent to the oil flow, at the rate of 0.4 cc. water per hour. The retention time of the oil in the column was approximately three minutes.

The deodorized oil product was compared organoleptically with a soybean oil control that had been deodorized batchwise at 410° F. for 3½ hours according to conventional methods. The two oils, after 3 days' storage at 140° F. were rated as 5.8 and 4.7 respectively. The ratings were determined by a skilled taste panel, trained in the taste evaluation of edible oils. The numerical ratings are based on a possible maximum rating of 10. The flavor stability of the oil produced by our invention thus possesses flavor stability superior to the control sample.

Example II

Soybean oil, having been previously degummed, refined, and bleached was deodorized as in Example I. Instead of using countercurrent stripping steam, however, 0.5 percent ethanol, by volume, was added to the feed oil. The absolute pressure was maintained at 27 microns mercury, and the temperature at 194° F. The feed rate was adjusted so that the retention time of the oil was approximately three minutes. The deodorized product was judged to be better than "acceptable" (rated at about 8 on a scale of 10) by two expert tasters.

Example III

The procedure of Example I was repeated using a feed oil flow rate of about 45 cc. per hour, the retention time being about seven minutes. The feed oil was preheated, and the temperature maintained at about 210° F. while in the column. The product was compared as in Example I, and no significant difference in flavor quality was found between the oil and the control either as freshly deodorized or after 3 days' storage at 140° F.

Example IV

Example I was repeated, using as feed oil a vacuum stripped oil freshly heat-bleached under vacuum at 428° F. A larger packed column was used, permitting a feed oil flow rate of about 190 cc. per hour. The jacket of the column was held at 212° F., and about 4 cc. per hour of water was used for countercurrent stripping.

Example V

Example II was repeated, using, however, the column of Example IV and feed oil in which was dissolved 1 percent heptane as stripping agent. The absolute pressure in the column was maintained at 60 microns, and the temperature at 212° F. The feed rate was adjusted so that the retention time in the column was about nine minutes.

The flavor of the products of Examples IV and V were judged to be superior to that of the feed oils used.

We claim:

1. The method comprising deodorizing a glyceride oil by subjecting said oil in a zone of deodorization to a temperature within the range of 190° to 250° F. and a pressure within the range of 20 to 60 microns for a period of at least three minutes, the while continuously withdrawing from said oil material volatilized therefrom and separating said volatilized material from said oil.

2. In the process of refining glyceride oils which includes the steps of degumming, alkali refining, bleaching and deodorizing said oil, the improvement comprising deodorizing said oil at a temperature within the range of 190° to 250° F. and a pressure within the range of 20 to 60 microns, thus volatilizing material from said oil, and separating said volatilized material from said oil.

3. The method comprising continuously deodorizing a degummed, alkali-refined, and bleached glyceride oil by separatory distillation of said oil at a temperature within the range of 190° to 250° F. and a pressure within the range of 20 to 60 microns, conducting said distillation while said oil is disposed in a relatively thin surface, the while continuously withdrawing from said oil material volatilized therefrom and separating said volatilized material from said oil.

4. Method of claim 1 in which withdrawal of volatilized material from the oil being deodorized is facilitated by a volatile stripping agent passing countercurrent to the direction of flow of the oil in the zone of deodorization.

5. Method of claim 1 in which withdrawal of volatilized material from the oil being deodorized is facilitated by adding 0.1 to 5 percent of a volatile stripping agent to the oil previous to entry into the zone of deodorization.

6. The method as in claim 4 in which the volatile stripping agent is a member of the group consisting of ethanol and heptane.

7. The method as in claim 5 in which the volatile stripping agent is a member of the group consisting of ethanol and heptane.

References Cited in the file of this patent

UNITED STATES PATENTS

| Number | Name | Date |
|---|---|---|
| 2,508,919 | Jakobsen | May 23, 1950 |

FOREIGN PATENTS

| Number | Country | Date |
|---|---|---|
| 16,954 | Great Britain | of 1892 |
| 20,413 | Great Britain | of 1893 |